United States Patent [19]

Miki et al.

[11] 4,122,134

[45] * Oct. 24, 1978

[54] METHOD FOR PRODUCING TRANSPARENT BLOCK COPOLYMER RESIN

[75] Inventors: Tamotsu Miki; Shizuo Narisawa; Ichiro Ichikawa; Hideki Horiike, all of Ichihara, Japan

[73] Assignee: Sumitomo Chemical Company, Limited, Osaka, Japan

[ * ] Notice: The portion of the term of this patent subsequent to Oct. 18, 1994, has been disclaimed.

[21] Appl. No.: 827,079

[22] Filed: Aug. 23, 1977

Related U.S. Application Data

[63] Continuation of Ser. No. 721,809, Sep. 9, 1976, abandoned, which is a continuation of Ser. No. 548,788, Feb. 10, 1975, abandoned.

[30] Foreign Application Priority Data

Feb. 13, 1974 [JP] Japan ................................. 49-18018
Jun. 12, 1974 [JP] Japan ................................. 49-67377

[51] Int. Cl.² .......................................... C08F 297/04
[52] U.S. Cl. ................................................ 260/880 B
[58] Field of Search ..................................... 260/880 B

[56] References Cited

U.S. PATENT DOCUMENTS

| | | | |
|---|---|---|---|
| 3,251,905 | 5/1966 | Zelinski | 260/880 B |
| 3,778,490 | 12/1973 | Hsieh | 260/880 B |
| 3,853,978 | 12/1974 | Horiie | 260/880 B |
| 3,872,068 | 3/1975 | Horiie | 260/880 B |
| 4,054,616 | 10/1977 | Miki | 260/880 B |

*Primary Examiner*—Paul R. Michl
*Attorney, Agent, or Firm*—Stevens, Davis, Miller & Mosher

[57] ABSTRACT

By block-copolymerizing a vinyl aromatic compound and a conjugated diene in a hydrocarbon solvent with an organolithium compound as initiator, there is obtained a block copolymer which comprises in the molecule three blocks of homopolymerized vinyl aromatic compound, randomly copolymerized vinyl aromatic compound and conjugated diene, and homopolymerized diene, respectively. The resulting block copolymer is transparent and excellent in mechanical properties, and is suitable for use in the manufacture of sheeting, film, and various molded articles.

31 Claims, No Drawings

METHOD FOR PRODUCING TRANSPARENT BLOCK COPOLYMER RESIN

This is a continuation of application Ser. No. 721,809 filed Sept. 9, 1976, now abandoned, which in turn is a continuation of application Ser. No. 548,788, filed Feb. 10, 1975, now abandoned.

This invention relates to a method for producing a novel block copolymer resin which is transparent and excellent in mechanical properties. More particularly, it relates to a novel method for producing a block copolymer resin which is transparent, excellent in mechanical properties, particularly in elongation and impact resistance, and not susceptible to flexural stress clouding.

It has heretofore been known that block copolymers of various structures are obtained by copolymerizing vinyl aromatic compounds and conjugated dienes with an alkali metal or an organo-alkali-metal compound as initiator. There has been disclosed, for example, in Japanese patent publication No. 19,286/61, a method for block-copolymerizing styrene, butadiene, etc., in two stages using a lithium compound; in Japanese patent publication No. 2,423/73, a method for synthesizing a three-block copolymer in two stages using similar monomers; in Japanese patent publication Nos. 3,252/72 and 28,915/72, methods for preparing a transparent resin by feeding similar monomers alternately in four or five stages; and in Japanese Patent Application Laid-Open ("Kōkai") No. 7,597/71, German patent application Laid-Open (Offenlegungsschrift) No. 2,120,232, and Japanese Patent Publication No. 20,038/73, methods for preparing a transparent resin by single stage polymerization from similar monomers.

These methods employ as the polymerization initiator an organolithium compound generally known as one-end initiation type or that known as both-ends initiation type. In either case, these methods are characterized by forming a polymer by means of a living anionic polymerization technique so that each polymer molecule may comprise a plastic block composed chiefly of polymerized vinyl aromatic compound and an elastomeric block composed chiefly of polymerized conjugated diene. It has been known, however, that when the elastomeric block is composed exclusively of a homopolymer of a conjugated diene, the block copolymer obtained is not sufficient for practical use in elongation, impact strength, and resistance to flexure among mechanical properties (Example 11 in Japanese patent publication No. 19,286/61; Japanese patent publication No. 2,423/73), giving rise to a disadvantage of the block copolymer in practical application as a resin. On the other hand, in a method where a monomer mixture is added all at a time [Japanese Patent Application Laid-Open ("Kōkai") No. 7,597/71; German patent application Laid-Open ("Offenlegungsschrift") No. 2,120,232; Japanese patent publication No. 20,038/73], there is always formed a copolymer block between the plastic block composed chiefly of polymerized vinyl aromatic compound and the elastomeric block composed chiefly of conjugated diene owing to the difference in monomer reactivites. In this case, however, a technical difficulty is encountered in removing a large quantity of heat evolved from the polymerization of monomers which have been added all at a time. Such a difficulty would certainly be a deterrent to the commercialization of the method.

The present inventors had conducted extensive investigations to develop a method for producing from a vinyl aromatic compound monomer and a conjugated diene monomer as starting materials a transparent resin which is excellent in mechanical properties, particularly in impact resistance, and susceptible to neither flexural stress clouding nor reduction in mechanical properties at low temperatures. As a result, it was found that the above object can be achieved by a method for producing a block copolymer by means of an anionic living polymerization technique using an organolithium compound as initiator, which method comprises forming the block copolymer so as to contain in the molecule at least one plastic block composed of homopolymerized vinyl aromatic compound and at least one elastomeric block partly composed of randomly copolymerized vinyl aromatic compound and conjugated diene in a specified ratio. Based on this finding, the present invention has been accomplished.

An object of this invention is to provide a novel resin, which is transparent and excellent in mechanical properties, obtained from a vinyl aromatic compound monomer and a conjugated diene monomer as starting materials and a method for preparing same.

Other objects and advantages of this invention will become apparent from the following description.

This invention provides a method for producing a transparent block copolymer resin, which is characterized by the following five essential conditions in block-copolymerizing 90 to 65 parts by weight of a vinyl aromatic compound monomer and 10 to 35 parts by weight of a conjugated diene monomer in a hydrocarbon solvent with an organolithium compound as initiator: (1) formation of a block copolymer having in the molecule at least one plastic block composed of homopolymerized vinyl aromatic compound and at least one elastomeric block composed of randomly copolymerized vinyl aromatic compound and conjugated diene, (2) formation of said plastic block composed of homopolymerized vinyl aromatic compound by use of 50 to 90% by weight of the vinyl aromatic compound monomer, (3) formation of said elastomeric block in such a manner that it may contain a randomly copolymerized segment formed by continuously feeding to the polymerizing system a monomer mixture of the vinyl aromatic compound and the conjugated diene in a fixed ratio in the range from 0.1 to 3.0, a homopolymerized conjugated diene segment, and/or a randomly copolymerized segment formed by feeding all at a time or continuously to the polymerization system a monomer mixture of the vinyl aromatic compound and the conjugated diene in a fixed weight ratio of less than 0.1, preferably in the range from 0.001 to 0.1; the first named randomly copolymerized segment occupying 50% by weight or more of the elastomeric block, (4) formation of the block copolymer having an average molecular weight of 0.35 to 1.8 dl/g in terms of intrinsic viscosity, as measured in toluene at 30° C., and (5) the polymerization conducted in the presence or absence of 0.01 to 5 mole-% based on total monomer of a Lewis base compound. The present method would present no particular difficulty in commercialization. The block copolymer resin thus produced is characterized by transparency, excellent mechanical properties, particularly a high impact resistance, little susceptibility to flexural stress clouding, and good processability, permitting the resin to be used in manufacturing sheeting, film, usual molded articles, and in other fields where ordinary resins are used.

The method of this invention is explained below in detail.

The vinyl aromatic compounds for use in this invention are styrene and α-methylstyrene, vinylnaphthalene, and nucleus-substituted styrenes such as vinyltoluene, and mixtures of these. The conjugated dienes to be used are 1,3-butadiene and substituted butadienes such as isoprene, piperylene, 2,3-dimethyl-1,3-butadiene, 1-phenyl-1,3-butadiene, and mixtures of these. Particularly, styrene among vinyl aromatic compounds and 1,3-butadiene among conjugated dienes are preferable because of their availability and effectiveness.

The monomer composition in this invention is 90 to 65 parts by weight of a vinyl aromatic compound for 10 to 35 parts by weight of a conjugated diene. If the vinyl aromatic compound is used in excess of 90 parts by weight, the elongation and impact strength among mechanical properties of the resin become inferior, while if its amount is reduced below 65 parts by weight, the tensile strength is decreased and the processability becomes inferior. In the present method, the block copolymer obtained has in the molecule at least one plastic block composed of homopolymerized vinyl aromatic compound. In forming said plastic block, are used 50 to 90% of the total vinyl aromatic compound monomer.

The inert hydrocarbons for use in this invention as solvents are aromatic hydrocarbons such as benzene, toluene, xylene, and ethylbenzene, aliphatic hydrocarbons such as hexane and heptane, and cycloaliphatic hydrocarbons such as cyclopentane, cyclohexane, and methylcyclohexane. These are used each alone or in mixtures of two or more. It is preferable to use generally 1 to 20 parts by weight of a hydrocarbon as solvent for one part by weight of the total monomer. It is necessary in advance to sufficiently remove from the above-mentioned solvents and monomers the substances such as water, oxygen, carbon dioxide, some kind of sulfur compounds and acetylenes which destroy the initiators and active ends used in the present invention. As a variation in the present method, it is also possible to obtain the block copolymer in the form of suspension in a solvent instead of the form of solution, by suitably selecting the solvent and the order of addition of the monomers.

The organolithium compound used in the present method is generally known as an anionic polymerization initiator of the one-end initiation type or of the both-ends initiation type. Examples of the individual compounds include ethyllithium, propyllithium, butyllithium, amyllithium, trimethylenedilithium, tetramethylenedilithium, hexyllithium, cyclohexyllithium, phenyllithium, tolyllithium, naphthyllithium, condensed-ring or non-condensed-ring aromatic lithium complexes, and oligobutadienyldilithium or oligoisoprenyldilithium in living form. These organolithium compounds are used in an amount of generally 0.002 to 5 mole-%, preferably 0.005 to 1.5 mole-% based on total monomer. The organolithium compounds are used each alone or in mixtures of two or more.

In the present method, as a part of the elastomeric block in the molecule, there is formed at least one random copolymer segment comprising a vinyl aromatic compound and a conjugated diene and such a segment occupies at least 50% by weight of the elastomeric block. In order to allow the polymerization in this stage to proceed smoothly, it is also possible to use specified amounts of a Lewis base compound such as, for example, an ether compound or a tertiary amine compound. Examples of effective ether compounds are cyclic ethers such as tetrahydrofuran and tetrahydropyrane; aliphatic monoethers such as diethyl ether and dibutyl ether; and aliphatic polyethers such as diethylene glycol dimethyl ether and diethylene glycol diethyl ether. Examples of tertiary amine compounds are triethylamine, tripropylamine, tributylamine, N,N'-dimethylaniline, pyridine, and quinoline. When such a Lewis base compound is used, the amount to be added is 0.01 to 5 mole-%, preferably 0.05 to 2 mole-% based on total monomer. If it is used in an amount exceeding the upper limit, content of vinyl-bond in the copolymer block composed of vinyl aromatic compound and conjugated diene and in the homopolymerized conjugated diene block becomes markedly high, resulting in marked deterioration in mechanical properties of the resin, particularly at low temperatures. The Lewis base compound can be added without any particular restriction to the polymerization system at any time prior to the stage where the copolymer region is formed.

In the present method, a vinyl aromatic compound monomer and a conjugated diene monomer are block-copolymerized in the presence of an organolithium compound. The block copolymer thus formed should have in the molecule at least one plastic block composed of homopolymerized vinyl aromatic compound and at least one elastomeric block containing a segment formed by copolymerization of a vinyl aromatic compound and a conjugated diene in a specified ratio. A block copolymer of a structure in which a homopolymerized vinyl aromatic compound block is absent or less than 50% by weight of the vinyl aromatic compound monomer are used in forming the homopolymerized block is undesirable because of defects in mechanical properties, particularly in tensile strength and hardness of the resin. On the other hand, a block copolymer of a structure in which more than 90%, particularly 100% by weight, of the vinyl aromatic compound monomer form the homopolymerized block is not called a useful resin because it is inferior in elongation and impact strength among mechanical properties and easily susceptible to flexural stress clouding. In a block copolymer of a structure in which two or more homopolymerized vinyl aromatic compound blocks are present, the sum of the vinyl aromatic compound used in each homopolymerized block should be 50 to 90% by weight of the total vinyl aromatic compound monomer.

In the present method, formation of the elastomeric block from a vinyl aromatic compound and a conjugated diene should be conducted in such a manner that the elastomeric block may contain a randomly copolymerized segment formed by continuously feeding to the polymerization system a monomer mixture of the vinyl aromatic compound and the conjugated diene in a fixed ratio in the range from 0.1 to 3.0, a homopolymerized conjugated diene segment, and/or a randomly copolymerized segment formed by feeding all at a time or continuously to the polymerization system a monomer mixture of the vinyl aromatic compound and the conjugated diene in a fixed weight ratio of less than 0.1, preferably in the range from 0.001 to 0.1. The segments composing the elastomeric block are not necessarily linked directly to one another but can be distributed separately throughout the block copolymer. The randomly copolymerized segment in the elastomeric block should be formed from a continuously fed monomer mixture of the vinyl aromatic compound and the conjugated diene in a fixed ratio in the range from 0.1 to 3.0. If the ratio is decreased below 0.1, the impact resistance among mechanical properties of the resulting block copolymer resin is deteriorated and the susceptibility to flexural stress clouding is increased, while if the ratio is increased beyond 3.0, the tensile strength and hardness of the resin become inferior, both cases being undesirable.

In the case of a block copolymer having a molecular structure in which two or more copolymer segments formed from a monomer mixture of the vinyl aromatic compound and the conjugated diene in the specified ratio as mentioned above are present, each of the segments should be formed from the monomer in the specified ratio and the ratio between the sum of the vinyl aromatic compound and the sum of the conjugated diene used in forming said segments should be maintained within the specified range from 0.1 to 3.0; the monomer ratio in forming each of the segments can be the same or different from one another.

The random copolymer segment formed by continuous feeding of a monomer mixture of the vinyl aromatic compound and the conjugated diene in a weight ratio of 0.1 to 3.0 should occupy 50% by weight or more of the total elastomeric block. If the proportion of random copolymer segment in the elastomeric block is below 50% by weight, particularly if it is null, such a block copolymer is undesirable because of its reduced impact resistance and elongation among mechanical properties and its enhanced susceptibility to flexural stress clouding. On the other hand, if the homopolymerized conjugated diene segment and/or the copolymer segment formed from a monomer mixture of the vinyl aromatic compound and the conjugated diene in a weight ratio of less than 0.1, preferably in the range of 0.001 to 0.1, is absent in the elastomeric block, such a block copolymer shows unsatisfactory mechanical properties, particularly at low temperatures. A preferable proportion of the random copolymer segment formed from a monomer mixture of the vinyl aromatic compound and the conjugated diene in a weight ratio of 0.1 to 3.0 is in the range from 50 to 90% by weight of the total elastomeric block. When two or more segments are present in the elastomeric block, the sum of the segments formed from a monomer mixture of the vinyl aromatic compound and the conjugated diene in a weight ratio of 0.1 to 3.0 should be 50% by weight or more of the elastomeric block.

In forming the radomly copolymerized segment by continuous addition of a vinyl aromatic compound and a conjugated diene, both monomers can be fed either in a mixture or separately, maintaining a fixed monomer ratio within the aforesaid range. In either case, it is necessary to feed both monomers in a fixed ratio continuously or substantially continuously to the polymerization system under such conditions of polymerization temperature and feeding rate that both monomers will not remain unreacted in the system.

The present method permits to adopt continuous feeding of the monomers in each stage of forming a block copolymer. This is one of the characteristic features of the present method, which allows effective removal of a large quantity of heat evolved from the polymerization reaction when carried out on an industrial scale and, moreover, prevents occurrence of side reactions such as gelation accompanying the heat evolution.

Although the block copolymer formed according to the present invention has no restriction placed on its structure so long as the conditions mentioned in the foregoing are satisfied, examples of particularly preferred structures are given below, wherein $S_1$, $S_2$, and $S_3$ represent homopolymerized vinyl aromatic compound block, $(S/B)_1$, $(S/B)_2$, and $(S/B)_3$ represent randomly copolymerized vinyl aromatic compound and conjugated diene block, and $B_1$ and $B_2$ represent homopolymerized conjugated diene block or a block formed from a monomer mixture of a vinyl aromatic compound and a conjugated diene in a weight ratio of less than 0.1, preferably in the range from 0.001 to 0.1.

$$S_1 - (S/B)_1 - B_1 \quad (1)$$

$$S_1 - B_1 - (S/B)_1 \quad (2)$$

$$S_1 - (S/B)_1 - B_1 - S_2 \quad (3)$$

$$S_1 - (S/B)_1 - B_1 - (S/B)_2 - S_2 \quad (4)$$

$$S_1 - B_1 - (S/B)_1 - B_2 - S_2 \quad (5)$$

$$S_1 - (S/B)_1 - (S/B)_2 - B_1 - S_2 \quad (6)$$

$$S_1 - (S/B)_1 - B_1 - (S/B)_2 - B_2 - (S/B)_3 - S_2 \quad (7)$$

$$S_1 - (S/B)_1 - S_2 - (S/B)_2 - B_1 - S_3 \quad (8)$$

$$S_1 - (S/B)_1 - B_1 - S_2 - B_2 - (S/B)_2 - S_3 \quad (9)$$

$$S_1 - (S/B)_1 - S_2 - B_1 - (S/B)_2 \quad (10)$$

$$S_1 - (S/B)_1 - S_2 - (S/B)_2 - B_1 \quad (11)$$

The present method is carried out by way of multistage polymerization. In each stage, addition of the monomer may be conducted at any time after the conversion in the preceding stage has reached substantially 100%. In the present method, it is possible to obtain an overall conversion of substantially 100%.

In the present method, the mean molecular weight of the block copolymer resin to be formed is regulated by the amount of an initiator used. According to this invention, the mean molecular weight of the block copolymer should have a value in the range from 0.35 to 1.8 dl/g in terms of intrinsic viscosity $\{[\eta]\}$, as measured in toluene at 30° C. A block copolymer of low molecular weight, which has an intrinsic viscosity below 0.35 dl/g, is undesirable because of decreased mechanical properties, while a resin of excessively high molecular weight, which shows an intrinsic viscosity exceeding 1.8 dl/g, is also undesirable because of deterioration in transparency and in processability.

The polymerization according to this invention is carried out at a temperature from $-20°$ to 150° C., preferably from 20° to 120° C. The polymerization pressure is selected from those which are sufficient to keep the monomer and solvent in liquid phase at the polymerization temperature. A sufficient polymerization time is 1 to 48 hours, usually 1 to 24 hours, though depending on polymerization conditions.

After the polymerization is completed, to the polymerization mixture is added sufficient amount of water, methanol, ethanol, or isopropanol to deactivate the active terminal of the polymer and the residual initiator. After adding, if necessary, a small amount of an antioxidant such as, for example, 4-methyl-2,6-di-tert-butylphenol, the polymer can be precipitated and recovered by use of an excess of methanol, ethanol, or isopropanol.

An alternative procedure is to recover the polymer by directly heating the polymerizable solution to dryness or by contacting the polymerizate solution with steam to remove the solvent by distillation.

The block copolymer obtained according to this invention can be processed by conventional processing techniques to be used in the field where the conventional resins have been used. The copolymer can also be compounded with conventional stabilizers, reinforcing agents, fillers, and various other additives.

As mentioned in the foregoing, the present invention provides a novel method for producing a copolymer resin, transparent and excellent in mechanical properties, from 90 to 65 parts by weight of a vinyl aromatic compound monomer and 10 to 35 parts by weight of a conjugated diene monomer, both used as starting materials, by adding to the polymerization system said monomers in specified sequence and in specified combinations using an organolithium compound as initiator. The present method may be easily carried out on a commercial scale and the resin obtained is characterized by transparency and excellent mechanical characteristics so that it may be used even in the field where conventional resins could not be successfully used.

The invention is illustrated below in detail with reference to Examples, but the invention is not limited to these examples.

EXAMPLE 1

Into a 2.5-liter glass autoclave provided with a stirrer, after the air in which had been replaced by argon, were charged 1.5 liters of purified, dried cyclohexane, 1.17 g of tetrahydrofuran, 125 g of purified styrene, and a hexane solution containing 6.5 millimoles of n-butyllithium. The autoclave was externally heated to 60° C. to conduct the first stage polymerization for one hour. Into the autoclave was then added under an argon pressure a mixture of 125 g of styrene and 75 g of butadiene, continuously for a period of about 2 hours to continue the second stage polymerization for 3 hours in total. Then, 50 g of butadiene was added into the autoclave to continue the third stage polymerization for one hour. After addition of another 125 g of styrene, the fourth stage polymerization was carried out for 1.5 hours. After a total of 6.5 hours, the polymerization was terminated by addition of 50 ml of methanol as terminating agent. The resulting solution was poured into a large amount of methanol to precipitate a polymer. The polymer obtained in a yield of 98.5% had an intrinsic viscosity [η] of 0.68 dl/g, as measured in toluene at 30° C. A mixture of 100 parts by weight of the polymer, 0.5 part of 4-methyl-2,6-di-tert-butylphenol and 0.5 part of tris(-nonylphenyl) phosphite, both used as antioxidant, was pelletized by means of an extruder and the pellets were injection molded to prepare specimens for testing physical properties. The molded specimen had an attractive appearance and a high transparency. The results of test were as shown in Table 1.

Table 1

| | |
|---|---|
| Intrinsic viscosity[1], dl/g | 0.68 |
| Melt index[2], g/10 minutes | 1.96 |
| Tensile strength (yield point)[3], kg/cm$^2$ | 171 |
| Tensile strength (breaking point)[3], kg/cm$^2$ | 239 |
| Elongation[3], % | 359 |
| Izod impact strength[4], kg . cm/cm$^2$ | >100 |
| Haze value[5], % | 7.5 |

Note:
[1]Measured on the polymer before pelletization, in toluene at 30° C. by means of an Ubbelohde viscometer.
[2]Measured according to JIS K 6760.
[3]Measured according to JIS K 6871 at 20° C. and at a speed of testing 5 mm/minute.
[4]Measured according to JIS K 6871 on unnotched specimens at 20° C.
[5]Measured according to ASTM D 1003.

EXAMPLES 2 TO 4

Polymerization was conducted by use of the same apparatus and in the same manner as in Example 1, except that combinations of the monomers were as shown in Table 2. In each Example, 1.17 g of tetrahydrofuran were used as the Lewis base compound.

Table 2

| Example No. | Monomer in 1st stage, g | Monomer in 2nd stage, g | Monomer in 3rd stage, g | Monomer in 4th stage, g | Period of time of continuous addition of monomers in 2nd stage, hour |
|---|---|---|---|---|---|
| 2 | Styrene 150 | Styrene 100 Butadiene 60 | Butadiene 40 | Styrene 150 | 2 |
| 3 | Styrene 150 | Styrene 75 Butadiene 75 | Butadiene 50 | Styrene 150 | 2 |
| 4 | Styrene 100 | Styrene 175 Butadiene 75 | Butadiene 50 | Sytrene 100 | 2 |

The polymer obtained was treated in the same manner as in Example 1. Results of test for physical properties were as shown in Table 3.

Table 3

| Ex. No. | Intrinsic viscosity, dl/g | Tensile strength, kg/cm$^2$ Yield point | Tensile strength, kg/cm$^2$ Breaking point | Elongation, % | Izod impact strength kg.cm/cm$^2$ | Haze value, % |
|---|---|---|---|---|---|---|
| 2 | 0.69 | 269 | 255 | 291 | 55 | 7.0 |
| 3 | 0.65 | 208 | 243 | 419 | >100 | 10.0 |
| 4 | 0.69 | 198 | 248 | 399 | >100 | 12.0 |

EXAMPLE 5

In a manner similar to that in Example 1, five-stage polymerization was carried out using the monomer combination as shown below. Polymerization in the second and fourth stages was conducted while feeding the monomer mixture under an argon pressure continuously for a period of 1.5 hours. The amounts of tetrahydrofuran and n-butyllithium were the same as in Example 1.

| | | |
|---|---|---|
| Monomer in the first stage: | Styrene | 125 g |
| Monomer in the 2nd stage: | Styrene | 62.5 g |
| | Butadiene | 37.5 g |
| Monomer in the 3rd stage: | Butadiene | 50 g |
| Monomer in the 4th stage: | Styrene | 62.5 g |
| | Butadiene | 37.5 g |
| Monomer in the 5th stage: | Styrene | 125 g |

The polymerization procedure in Example 1 was followed and the polymerizate obtained was treated in the same manner as in Example 1. The results of test for physical properties were as shown in Table 4.

Table 4

| | |
|---|---|
| Intrinsic viscosity, dl/g | 0.69 |
| Melt index, g/10 minutes | 0.91 |
| Tensile strength (yield point), kg/cm$^2$ | 205 |
| Tensile strength (breaking point), kg/cm$^2$ | 233 |
| Elongation, % | 384 |
| Izod impact strength, kg . cm/cm$^2$ | >100 |
| Haze value, % | 9.5 |

EXAMPLES 6 TO 8

Polymerization was carried out in the same manner as in Example 5, except that the monomer combinations used were as shown in Table 5. The amounts of n-butyllithium (as initiator) and tetrahydrofuran (Lewis base compound) were the same as in Example 5.

Table 5

| Example No. | Monomer in 1st stage, g | Monomer in 2nd stage, g | Monomer in 3rd stage, g | Monomer in 4th stage, g | Monomer in 5th stage, g |
|---|---|---|---|---|---|
| 6 | Styrene 150 | Styrene 50 Butadiene 30 | Butadiene 40 | Styrene 50 Butadiene 30 | Styrene 150 |
| 7 | Styrene 150 | Styrene 37.5 Butadiene 37.5 | Butadiene 50 | Styrene 37.5 Butadiene 37.5 | Styrene 150 |
| 8 | Styrene 100 | Styrene 87.5 Butadiene 37.5 | Butadiene 50 | Styrene 87.5 Butadiene 37.5 | Styrene 100 |

The polymerizate obtained was treated in the same way as in Example 1. The results of test for physical properties were as shown in Table 6.

Table 6

| Ex. No. | Intrinsic viscosity, dl/g | Tensile strength, kg/cm$^2$ Yield point | Tensile strength, kg/cm$^2$ Breaking point | Elongation, % | Izod impact strength, kg.cm/cm$^2$ | Haze value, % |
|---|---|---|---|---|---|---|
| 6 | 0.77 | 290 | 255 | 222 | 36 | 7.0 |
| 7 | 0.64 | 252 | 220 | 396 | 39 | 8.5 |
| 8 | 0.73 | 164 | 213 | 292 | >100 | 9.5 |

EXAMPLES 9 AND 10

Polymerization was carried out in the same manner as in Example 1, except that the monomer combinations were as shown in Table 7. As the Lewis base compound, 0.9 g of tetrahydrofuran was used.

Table 7

| Example No. | Monomer in 1st stage, g | Monomer in 2nd stage, g | Monomer in 3rd stage, g | Monomer in 4th stage, g | Manner of monomer addition in 3rd stage |
|---|---|---|---|---|---|
| 9 | Styrene 175 | Butadiene 25 | Styrene 75 | Styrene 175 | Continuous |
| 10 | Styrene 100 | Butadiene 75 | Butadiene 50 Styrene 150 Butadiene 75 | Styrene 100 | Continuous |

The polymerizate obtained was treated in the same manner as in Example 1. The results of test for physical properties were as shown in Table 8.

Table 8

| Ex. No. | Intrinsic viscosity, dl/g | Tensile strength, kg/cm$^2$ Yield point | Tensile strength, kg/cm$^2$ Breaking point | Elongation, % | Izod impact strength, kg.cm/cm$^2$ | Haze value, % |
|---|---|---|---|---|---|---|
| 9 | 0.90 | 326 | 210 | 95 | 25 | 7.0 |
| 10 | 0.72 | 210 | 248 | 260 | >100 | 12.0 |

EXAMPLE 11

In the present Example, oligoisoprenyldilithium compound was synthesized in the following manner and used as an organolithium compound of the both-ends initiation type.

Into a 300-ml four-necked flask, after the air in which had been replaced with argon, were charged 50 ml of purified tetrahydrofuran and 0.35 g (0.05 mole) of dispersed metallic lithium. Into the flask was added with stirring 6.4 g (0.05 mole) of naphthalene dissolved in 150 ml of tetrahydrofuran through a dropping funnel and allowed to react for 24 hours. To the reaction solution, after having been cooled to −40° to −50° C., was added gradually 40 ml of isoprene with a period of about 6 hours. Thereafter, the flask was warmed slowly to room temperature and further heated under reduce pressure to remove tetrahydrofuran by distillation. The contents of flask were dissolved by adding 400 ml of purified benzene, and the resulting benzene solution was subdivided into small portions and stored in ampoules to be used later in polymerization.

The polymerization according to this invention was carried out by use of the same apparatus as in Example 1 in the following way.

Into the reactor, were added 1.5 liters of cyclohexane, 0.9 g of tetrahydrofuran, 50 g of butadiene, and 120 ml of oligoisoprenyldilithium initiator solution, and allowed to react at 60° C. for 2 hours. To the reaction mixture, was added continuously a mixture of 125 g of styrene and 75 g of butadiene to continue the polymerization for 3 hours. Then, 250 g of styrene was added and polymerization was allowed to proceed for 1.5 hours. After termination of the polymerization, the polymerizate mixture was treated in the same manner as in Example 1. Physical properties of the polymer obtained were as shown in Table 9.

Table 9

| | |
|---|---|
| Intrinsic viscosity, dl/g | 0.73 |
| Tensile strength (yield point), kg/cm$^2$ | 197 |
| Tensile strength (breaking point), kg/cm$^2$ | 228 |
| Elongation, % | 372 |
| Izod impact strength, kg . cm/cm$^2$ | >100 |
| Haze value, % | 10.5 |

COMPARATIVE EXAMPLES 1 TO 4

Polymerization and after-treatment were carried out in the same manner as in Example 1, except that the combinations of monomer and a Lewis base compound were as shown in Table 10. The results obtained were as shown in Table 11.

Table 10

| Comparative Example No. | Monomer in 1st stage, g | Monomer in 2nd stage, g | Monomer in 3rd stage, g | Monomer in 4th stage, g | Lewis base compound, g | Addition of monomer in 2nd and 3rd stages |
|---|---|---|---|---|---|---|
| 1 | Styrene 200 | Butadiene 100 | Styrene 200 | | None | Continuous |
| 2 | Styrene 200 | Butadiene 100 | Styrene 200 | | Tetrahydrofuan 0.9 | Continuous |
| 3 | Styrene 150 | Butadiene 40 | Styrene 100 Butadiene 60 | Styrene 150 | None | All at a time |
| 4 | Styrene 195 | Butadiene 80 | Styrene 10 Butadiene 20 | Styrene 195 | Tetrahydrofuran, 0.9 | All at a time |

Table 11

| Comparative Example No. | Intrinsic viscosity, dl/g | Tensile strength, kg/cm² Yield point | Tensile strength, kg/cm² Breaking point | Elongation, % | Izod impact strength, kg·cm/cm² | Haze value, % |
|---|---|---|---|---|---|---|
| 1 | 0.72 | 334 | — | 12 | 13 | 7.0 |
| 2 | 0.78 | 330 | — | 16 | 13 | 7.5 |
| 3 | 0.73 | 314 | — | 19 | 14 | 7.5 |
| 4 | 0.74 | 295 | — | 27 | 15 | 7.5 |

As is apparent from Table 11, those block copolymers which have in the molecule an elastomeric block composed of polymerized conjugated diene alone are inferior in physical properties (Comparative Examples 1 and 2). It was also found that when the monomer mixture was added all at a time and polymerization was carried out in the absence of a Lewis base compound such as tetrahydrofuran, mechanical properties of the resulting polymer become markedly inferior (Comparative Example 3). It was further found that a block copolymer having elastomeric blocks in which the copolymerized conjugated diene and vinyl aromatic compound segments occupy less than 50% by weight is inferior in mechanical properties to the block copolymer prepared according to this invention (Comparative Example 4).

EXAMPLE 12

Into a 2.5-liter glass autoclave, after the air in which had been replaced with argon, were charged 1.5 liters of purified, dried, and deaerated cyclohexane and 150 g of styrene. A n-butyllithium solution diluted with n-hexane to a predetermined concentration was added dropwise into the stirred autoclave until a pale orange color characteristic of a polystyryl anion appeared. Thereafter, 6.5 millimoles of n-butyllithium was added as an initiator into the autoclave. The autoclave was heated to 100° C. and stirring was continued for one hour. A mixture prepared from 50 g of styrene and 30 g of purified dry butadiene was added to the polymerization system, maintained at 100° C., continuously at a rate of 1 g per minute. After the addition, stirring was continued for 30 minutes. Then, 40 g of butadiene was added and polymerization was continued for one hour. To the polymerization system was further added a mixture of 50 g of styrene and 30 g of butadiene continuously at a rate of 1 g per minute. After the addition, stirring was continued for 30 minutes and then 150 g of styrene was added to continue the polymerization for further 1 hour at 100° C.

The polymerization was terminated by addition of 50 ml of methanol and the resulting polymerizate solution was poured into a large amount of methanol containing 4-methyl-2,6-di-tert-butylphenol as antioxidant, to precipitate a polymer. The precipitated polymer was collected by filtration and dried in vacuo to obtain a dry polymer in a yield of 98.6%. The polymer had an intrinsic viscosity [η] of 0.70 dl/g, as measured in toluene at 30° C. A mixture of 100 parts by weight of the polymer, 0.5 part of 4-methyl-2,6-di-tert-butylphenol and 0.5 part of tris(nonylphenyl) phosphite, both used as antioxidant, was pelletized by means of an extruder. The pellets were injection molded to prepare specimens for testing physical properties. The molded specimen had an attractive appearance and a high transparency. The results of test were as shown in Table 12.

Table 12

| | |
|---|---|
| Intrinsic viscosity[1], dl/g | 0.70 |
| Melt index[2], g/10 minutes | 0.81 |
| Tensile strength[3], kg/cm² | 279 |
| Elongation[3], % | 220 |
| Izod impact strength[4], unnotched, kg·cm/cm² | 45.0 |
| Flexural stress clouding[5], mm | 3.3 |
| Glass transition temperature[6], ° C. | −58 |

Note:
[1]Measured on the polymer before pelletization, in toluene at 30° C. by use of Ubbelohde viscometer.
[2]Measured in accordance with JIS K 6760.
[3]Measured in accordance with JIS K 6871.
[4]Measured accordance with JIS K 6871, at 20° C., unnotched.
[5]A specimen, 38 mm × 13 mm, was cut out of a press-molded sheet, 1 mm in thickness, and annealed at 80° C. for 3 hours. The annealed specimen, without incision, was mounted on a holder specified in JIS Z 1703, left standing in the air at room temperature for 24 hours and the width of cracks distribution developed due to the stress was measured.
[6]Calculated from the kinetic viscoelasticity data as a function of temperature.

EXAMPLES 13 AND 14

Polymerization was carried out in the same manner as in Example 12, except that monomer combinations were as shown in Table 13.

Table 13

| Example No. | Monomer in 1st stage, g | Monomer in 2nd stage, g | Monomer in 3rd stage, g | Monomer in 4th stage, g | Monomer in 5th stage. g |
|---|---|---|---|---|---|
| 13 | Styrene 125 | Styrene 62.5 Butadiene 37.5 | Butadiene 50 | Styrene 62.5 Butadiene 37.5 | Styrene 125 |
| 14 | Styrene 150 | Styrene 37.5 Butadiene 37.5 | Butadiene 50 | Styrene 37.5 Butadiene 37.5 | Styrene 150 |

The polymerizate obtained was treated in the same manner as in Example 12. Physical properties of the polymer were as shown in Table 14.

Table 14

| Example No. | Intrinsic viscosity, dl/g | Melt index, g/10 min. | Tensile strength, kg/cm$^2$ | Elongation, % | Izod impact strength, kg . cm/cm$^2$ | Flexural stress clouding, mm |
|---|---|---|---|---|---|---|
| 13 | 0.69 | 0.91 | 205 | 384 | >100 | 4.3 |
| 14 | 0.76 | 0.29 | 215 | 272 | 33.3 | 4.0 |

EXAMPLE 15

In a manner similar to that in Example 12, four-stage polymerization was carried out by use of the monomer combinations shown below. Polymerization in each of the first, third, and fourth stages was conducted for one hour. The copolymer segment of styrene with butadiene was formed in the second stage while feeding the monomer mixture continuously at a rate of 1 g per minute.

| Monomer in the first stage: | styrene | 150 g |
|---|---|---|
| Monomer in the second stage: | styrene | 100 g |
| | butadiene | 60 g |
| Monomer in the third stage: | butadiene | 40 g |
| Monomer in the fourth stage: | styrene | 150 g |

The amount of n-butyllithium used as the initiator was 6.5 millimoles. The polymerizate obtained was treated in the same manner as in Example 12. The results of test physical properties were as shown in Table 15.

Table 15

| Intrinsic viscosity, dl/g | 0.71 |
|---|---|
| Melt index, g/10 minutes | 0.55 |
| Tensile strength, kg/cm$^2$ | 258 |
| Elongation, % | 213 |
| Izod impact strength, unnotched, kg . cm/cm$^2$ | 42.0 |
| Flexural stress clouding, mm | 3.1 |

EXAMPLE 16

In a manner similar to that in Example 12, seven-stage polymerization was carried out by use of the monomer combinations as shown below.

| Monomer in the first stage: | styrene | 150 g |
|---|---|---|
| Monomer in the second stage: | styrene | 25 g |
| | butadiene | 25 g |
| Monomer in the third stage: | butadiene | 25 g |
| Monomer in the fourth stage: | styrene | 25 g |
| | butadiene | 25 g |
| Monomer in the fifth stage: | butadiene | 25 g |
| Monomer in the sixth stage: | styrene | 25 g |
| | butadiene | 25 g |
| Monomer in the seventh stage: | styrene | 150 g |

The amount of the initiator used was 6.5 millimoles, as in Example 12. Polymerization was conducted for one hour in each of the first and seventh stages and for 30 minutes in each of the third and fifth stages. In the second and fourth stages, the monomer mixture was continuously fed at a rate of 1 g per minute. In Table 16 were shown physical properties of the polymer obtained after the treatment similar to that in Example 12.

Table 16

| Intrinsic viscosity, dl/g | 0.70 |
|---|---|
| Melt index, g/10 minutes | 0.60 |
| Tensile strength, kg/cm$^2$ | 233 |
| Elongation, % | 297 |
| Izod impact strength, unnotched, kg . cm/cm$^2$ | 50.3 |
| Flexural stress clouding, mm | 4.6 |

COMPARATIVE EXAMPLES 5 TO 8

Polymerization was carried out in the same manner as in Example 12, except that the monomer combinations and methods of feeding monomers in forming the copolymer segments of styrene with butadiene and the homopolymerized butadiene segments were as shown in Table 17.

Table 17

| Comparative Example No. | Monomer in 1st stage, g | Monomer in 2nd stage, g | Monomer in 3rd stage, g | Method of monomer feeding in forming styrene-butadiene copolymer segment and butadiene homopolymer segment |
|---|---|---|---|---|
| 5 | Styrene 400 Butadiene 100 | — | — | In 1st stage, monomer mixture was fed continuously at a rate of 1 g/min. |
| 6 | Styrene 200 | Butadiene 100 | Styrene 100 | In 2nd stage, butadiene was fed continuously at a rate of 1 g/min. |
| 7 | Styrene 100 | Styrene 100 Butadiene 100 Styrene 100 | Styrene 150 | In 2nd stage, styrene and butadiene were fed all at a time. In 2nd stage, monomer |

Table 17-continued

| Comparative Example No. | Monomer in 1st stage, g | Monomer in 2nd stage, g | Monomer in 3rd stage, g | Method of monomer feeding in forming styrene-butadiene copolymer segment and butadiene homopolymer segment |
|---|---|---|---|---|
| 8 | Styrene 150 | Butadiene 100 | Styrene 150 | mixture was fed continuously at a rate of 1 g/min. |

After having been treated in the same manner as in Example 12, the polymer obtained was tested for physical properties. The results obtained were as shown in Table 18.

Table 18

| Comparative Example No. | Intrinsic viscosity, dl/g | Melt index, g/10 min. | Tensile strength, kg/cm² | Elongation, % | Izod impact strength, kg · cm/cm² | Flexural stress clouding, mm | Glass transition temperature, °C. |
|---|---|---|---|---|---|---|---|
| 5 | 0.86 | 1.14 | No yield point | 391 | >100 | 0 | −36 |
| 6 | 0.72 | 0.12 | 334 | 12 | 13.0 | Broken during test | −95 |
| 7 | 0.85 | 0.07 | 310 | 45 | 15.5 | 22.0 | −81 |
| 8 | 0.64 | 1.99 | 263 | 279 | >100 | 2.8 | −2 |

It is seen from the results that if the copolymer lacks in homopolymerized styrene block, as in Comparative Example 5, tensile strength of the resin becomes markedly low, while if in the second stage butadiene was homopolymerized or styrene and butadiene were copolymerized to form less randomly copolymerized segment by feeding the monomer mixture all at a time, as in Comparative Examples 6 and 7, the resulting block copolymers become inferior in elongation and impact strength, and more susceptible to flexural stress clouding. Therefore, such copolymers are undesirable.

On the other hand, if in the second stage styrene and butadiene were randomly copolymerized by continuously feeding the monomer mixture and no homopolymerized butadiene segment was formed, as in Comparative Example 8, the resulting polymer becomes superior in impact strength and less susceptible to flexural stress clouding, whereas the glass transition point becomes higher, indicating deteriorated mechanical properties at low temperatures.

What is claimed is:

1. In a process for forming a block copolymer having in the molecule at least one plastic block composed of a homopolymer of a vinyl aromatic compound and at least one elastomeric block composed of a vinyl aromatic compound and a conjugated diene by block-copolymerizing 90 to 65 parts by weight of a vinyl aromatic compound monomer and 10 to 35 parts by weight of a conjugated diene monomer in a hydrocarbon as solvent with an organolithium compound as initiator in the presence or absence of 0.01 to 5 mole-% based on total monomer of a Lewis base compound, the improvement whereby a transparent block copolymer is formed, which comprises forming a block copolymer which has a plastic block formed by homopolymerizing 50 to 90% by weight of total vinyl aromatic compound monomer and an elastomeric block composed of (1) a random copolymer segment formed by continuously feeding to the polymerization system a monomer mixture of a vinyl aromatic compound and a conjugated diene in a fixed weight ratio in the range from 0.1 to 3.0, (2) a segment formed by homopolymerizing a conjugated diene, and/or (3) a random copolymer segment formed by feeding a monomer mixture of a vinyl aromatic compound and a conjugated diene in a fixed weight ratio of less than 0.1 continuously to the polymerization system; said segment (1) occupying 50 to 90% by weight of said elastomeric block; said block copolymer having a structure represented by any of the following formulae:

$$S_1 - (S/B)_1 - B_1 \tag{1}$$

$$S_1 - B_1 - (S/B)_1 \tag{2}$$

$$S_1 - (S/B)_1 - B_1 - S_2 \tag{3}$$

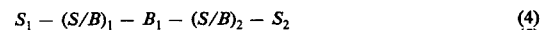
$$S_1 - (S/B)_1 - B_1 - (S/B)_2 - S_2 \tag{4}$$
$$S_1 - B_1 - (S/B)_1 - B_2 - S_2 \tag{5}$$

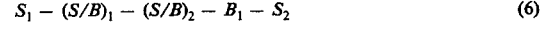
$$S_1 - (S/B)_1 - (S/B)_2 - B_1 - S_2 \tag{6}$$

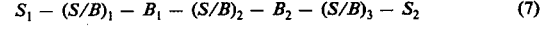
$$S_1 - (S/B)_1 - B_1 - (S/B)_2 - B_2 - (S/B)_3 - S_2 \tag{7}$$

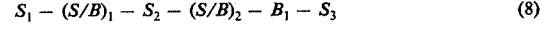
$$S_1 - (S/B)_1 - S_2 - (S/B)_2 - B_1 - S_3 \tag{8}$$

$$S_1 - (S/B)_1 - B_1 - S_2 - B_2 - (S/B)_2 - S_3 \tag{9}$$

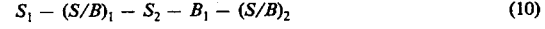
$$S_1 - (S/B)_1 - S_2 - B_1 - (S/B)_2 \tag{10}$$

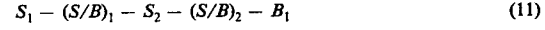
$$S_1 - (S/B)_1 - S_2 - (S/B)_2 - B_1 \tag{11}$$

wherein $S_1$, $S_2$, and $S_3$ represent homopolymerized vinyl aromatic compound blocks, $(S/B)_1$, $(S/B)_2$, and $(S/B)_3$ represent randomly copolymerized vinyl aromatic and conjugated diene segments or segments formed by feeding a vinyl aromatic compound and a conjugated diene in a weight ratio in the range from 0.001 to 0.1; said block copolymer having an average molecular weight of 0.35 to 1.8 dl/g in terms of intrinsic viscosity as measured in toluene at 30° C.

2. A process according to claim 1, wherein the vinyl aromatic compound is at least one member selected from the group consisting of styrene, α-methylstyrene and vinyltoluene.

3. A process according to claim 2, wherein the vinyl aromatic compound is styrene.

4. A process according to claim 1, wherein the conjugated diene is at least one member selected from the group consisting of 1,3-butadiene, isoprene and piperylene.

5. A process according to claim 4, wherein the conjugated diene is 1,3-butadiene.

6. A process according to claim 1, wherein the hydrocarbon is at least one member selected from the group consisting of paraffinic, naphthenic and aromatic hydrocarbons having 3 to 20 carbon atoms.

7. A process according to claim 6, wherein the hydrocarbon is at least one member selected from the group consisting of hexane, heptane, cyclohexane, methylcyclohexane, benzene and toluene.

8. A process according to claim 1, wherein the hydrocarbon is used in a proportion of 1 to 20 parts by weight per part by weight of the total monomer.

9. A process according to claim 1, wherein the Lewis base compound is at least one member selected from the group consisting of an ether compound and a tertiary amine compound.

10. A process according to claim 9, wherein the ether compound is at least one member selected from the group consisting of cyclic ethers, aliphatic monoethers and aliphatic polyethers.

11. A process according to claim 10, wherein the ether compound is at least one member selected from the group consisting of tetrahydrofuran, tetrahydropyran, diethyl ether, dibutyl ether, ethylene glycol dimethyl ether and diethyleneglycol diethyl ether.

12. A process according to claim 9, wherein the tertiary amine compound is at least one member selected from the group consisting of triethylamine, tripropylamine, tributylamine, N,N'-dimethylaniline and pyridine.

13. A process according to claim 1, wherein the Lewis base compound is used in a proportion of 0.05 to 2 mole-% based on the total monomer.

14. A process according to claim 1, wherein the Lewis base compound is not used.

15. A process according to claim 1, wherein the organolithium compound is at least one member selected from the group consisting of an organomonolithium compound and an organodilithium compound.

16. A process according to claim 15, wherein the organomonolithium compound is at least one member selected from the group consisting of ethyllithium, propyllithium, butyllithium, amyllithium, hexyllithium, 2-ethylhexyllithium, cyclohexyllithium, decyllithium, dodecyllithium, phenyllithium, tolyllithium, xylyllithium and naphthyllithium.

17. A process according to claim 16, wherein the organomonolithium compound is butyllithium.

18. A process according to claim 15, wherein the organodilithium compound is at least one member selected from the group consisting of trimethylenedilithium, tetramethylenedilithium, pentamethylenedilithium, naphthalene-lithium complex, stilbenelithium complex, diphenyl-lithium complex, oligobutadienyldilithium and oligoisoprenyldilithium.

19. A process according to claim 18, wherein the organodilithium compound is at least one member selected from the group consisting of oligobutadienyldilithium and oligoisoprenyldilithium.

20. A process according to claim 1, wherein the organolithium compound is used in a proportion of 0.002 to 5 mole-% based on the total monomer.

21. A process according to claim 1, wherein in forming the molecule two or more plastic blocks composed of vinyl aromatic compound homopolymer, the sum of the vinyl aromatic compound used in each plastic block is 50 to 90% by weight of the total monomer.

22. A process according to claim 1, wherein in forming in the molecule two or more elastomeric blocks composed of a random copolymer of a vinyl aromatic compound and a conjugated diene, the weight ratio between the vinyl aromatic compound and the conjugated diene used in forming each elastomeric block is in the range from 0.1 to 3.0 and the weight ratio between the vinyl aromatic compound and the conjugated diene used in forming all of the elastomeric blocks is also in the range from 0.1 to 3.0.

23. A process according to claim 22, wherein in forming in the molecule two or more elastomeric blocks by feeding continuously a vinyl aromatic compound and a conjugated diene in a fixed ratio, said fixed ratio is different in each of the elastomeric blocks.

24. A process according to claim 22, wherein in forming the elastomeric block, the vinyl aromatic compound and the conjugated diene are fed in a fixed ratio continuously or consecutively deemed as substantially continuously.

25. A process according to claim 24, wherein the monomer mixture is fed at such a rate that the monomers which were fed may polymerize substantially instantly under the polymerization conditions and not remain unpolymerized in the polymerization system.

26. A process according to claim 1, wherein the conjugated diene homopolymer segment occupies less than 50% by weight of the elastomeric block.

27. A process according to claim 1, wherein less than 50% by weight of the elastomeric block are occupied by the segment formed by feeding a monomer mixture of a conjugated diene and a vinyl aromatic compound in a fixed weight ratio in the range from 0.001 to 0.1, continuously to the polymerization system.

28. A process according to claim 1, wherein in forming all blocks, the monomer or the monomer mixture is fed continuously.

29. A process according to claim 1, wherein the polymerization is effected at a temperature in the range from 20° to 120° C.

30. A process according to claim 1, wherein after completion of the polymerization, the polymerization solution is contacted with excess of a lower alcohol, or directly heated to dryness, or mixed with steam, thereby removing the solvent to recover the polymer.

31. A block copolymer resin prepared by the process according to claim 1.

* * * * *